Patented July 5, 1938

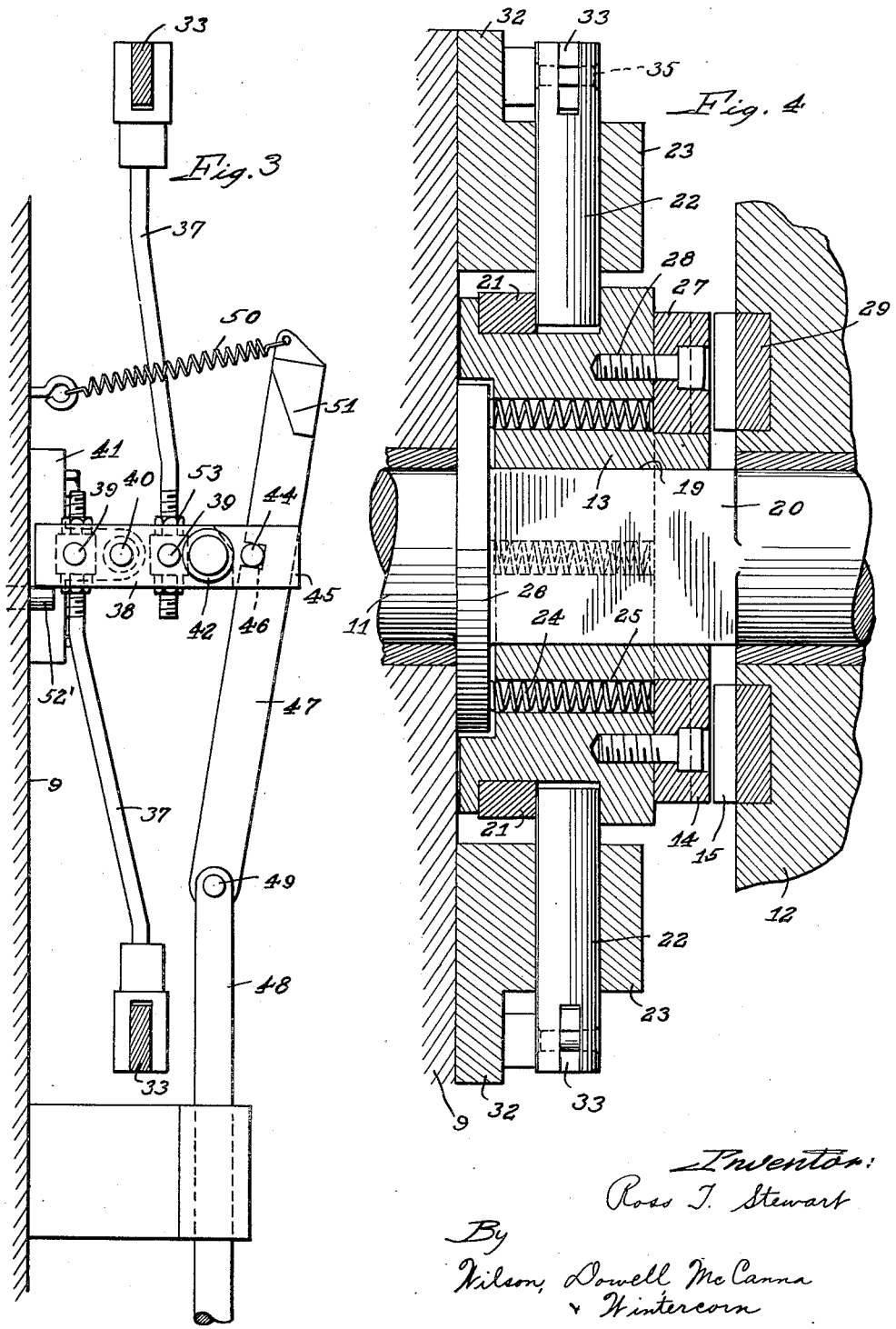

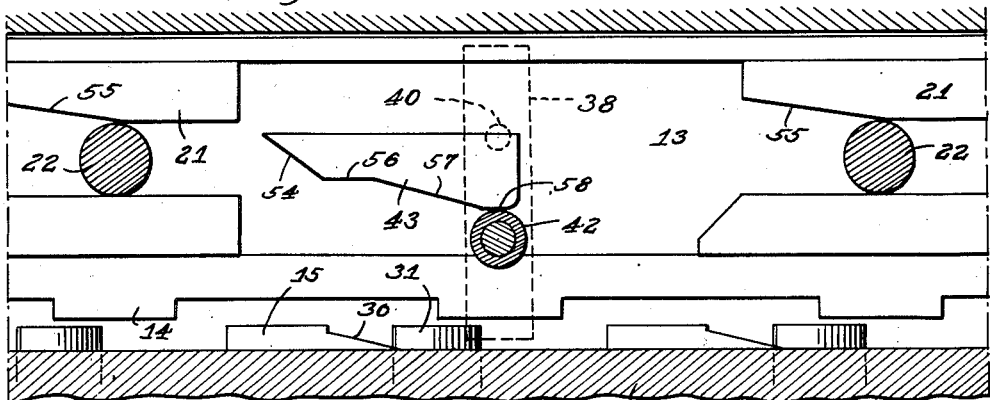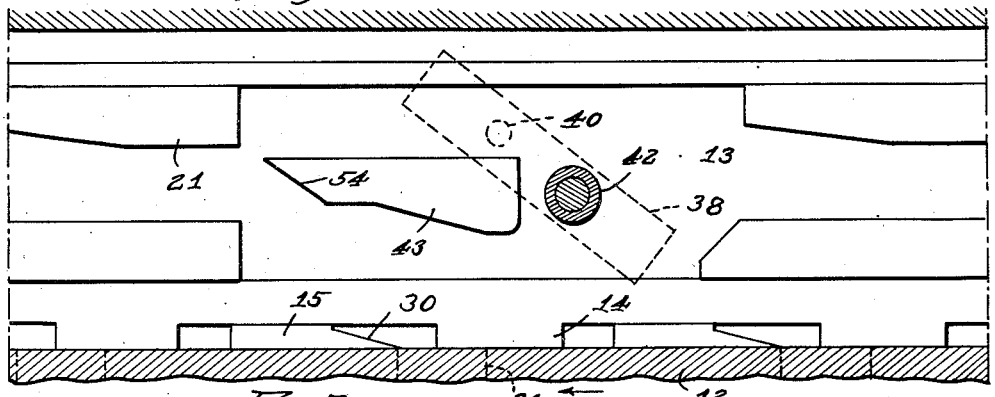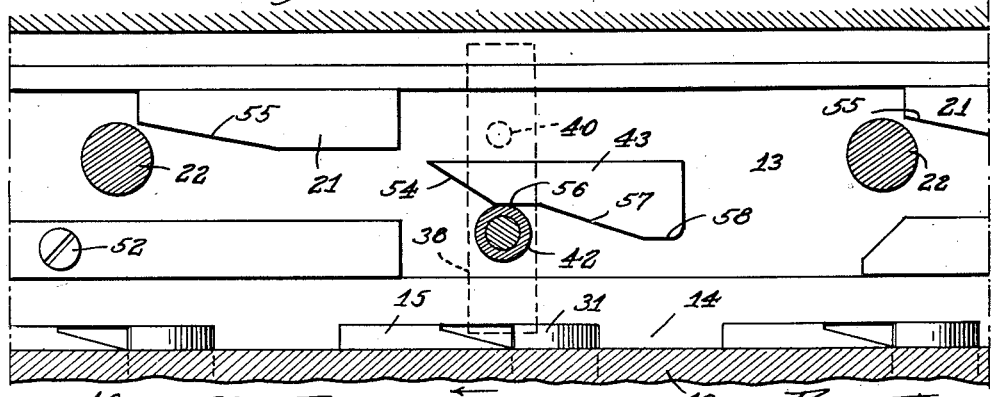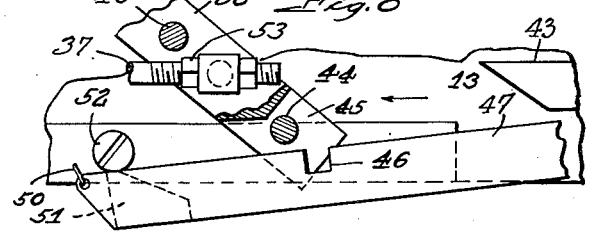

2,122,594

UNITED STATES PATENT OFFICE 2,122,594

CLUTCH AND OPERATING MECHANISM THEREFOR

Ross T. Stewart, Rockford, Ill., assignor to Geo. H. Spengler Co., Rockford, Ill., a corporation of Illinois Application September 8, 1936, Serial No. 99,698

19 Claims. (Cl. 192—24)

This invention relates to a new and improved single revolution clutch and operating mechanism therefor.

It is well known that in the operation of punch presses and the like serious accidents have been caused by the failure of the single revolution clutch to disengage after one operation. There have also been serious injuries caused by careless foot treadle operation on the part of the operator. It is therefore the principal object of my invention to provide a single revolution clutch with an operating mechanism which not only insures positive disengagement of the clutch after each operation, but also prevents the driven member from being given another turn in the event the operator, through carelessness or otherwise, keeps the foot treadle depressed.

The invention further aims to provide a single revolution clutch of improved design in which the driven member is in the form of a collar slidable to and fro on a squared portion of the driven shaft, and having spring means symmetrically arranged therein to insure quick engagement of the clutch when the collar is released and cam means on the periphery thereof cooperating with symmetrically arranged pins movable toward and away from the collar for positively disengaging the clutch, thus eliminating danger of the clutch failing to operate properly due to frictional drag or binding.

The invention is illustrated in the accompanying drawings, in which—

Figure 2:
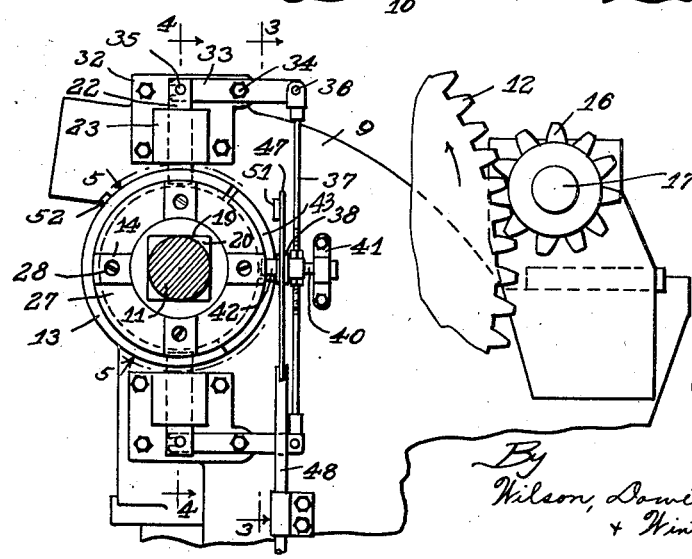
Fig. 2 is a section taken on the line 2—2 of Fig. 1.

Figs. 3 and 4 are cross-sections on the lines 3—3 and 4—4 of Fig. 2, on a larger scale;

Figs. 5, 6, and 7 are developed views, partly in section and partly in plan on the arcuate line 5—5 of Fig. 2, showing the parts in different positions in a complete cycle, and Fig. 8 is a fragmentary sectional view illustrating how the treadle link is arranged to be automatically disconnected from the clutch operating mechanism in the event the operator keeps the treadle depressed.

The same reference numerals are applied to corresponding parts throughout the views.

Figure 1:
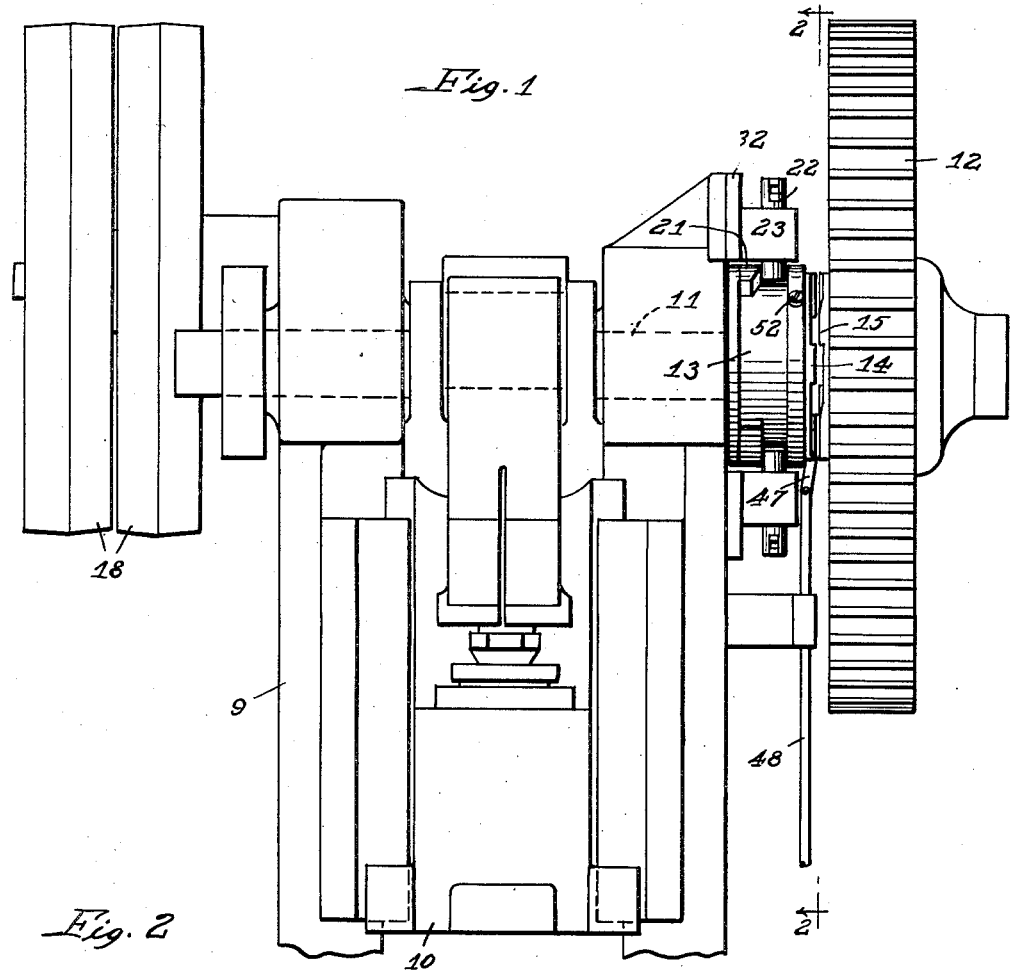
Figure 1 is a front view of the upper end of a punch press embodying a clutch and operating mechanism therefor made in accordance with my invention.

The parts shown at 9 in Figs. 1 and 2 are the spaced columns of a punch press between which the usual ram 10 is guided for reciprocation in the turning of the crank shaft 11. The shaft 11 is hereinafter referred to as the driven shaft, and carries a large gear 12 thereon arranged to turn idly relative to the shaft or transmit drive to the shaft accordingly as the collar 13 has its clutch teeth or jaws 14 disengaged from or engaged with the clutch teeth or jaws 15 on the gear 12. The gear 12 will hereinafter be referred to as the driving member, and the collar 13 as the driven member. Drive is transmitted to the gear 12 by a pinion 16 on a jack shaft 17 suitably supported in bearings on the columns 9, and carrying the usual pulleys 18, one of which is an idler turning freely on the shaft, and the other of which is fixed to the shaft so as to transmit drive thereto when the driving belt (not shown) is shifted from the idler to the drive pulley.

In accordance with my invention, the collar 13 has a square bore 19 in which the squared portion 20 of the driven shaft 11 is received with an easy working fit so that the collar is slidable toward and away from the drive gear 12 quickly and without any tendency to bind. The broad flat surfaces in the bore 19 and on the squared portion 20 of the shaft reduce the wear incident to the transmission of drive from the gear 12 through the collar 13 to the shaft 11 to a minimum, and there is therefore less danger of objectionable backlash developing between the parts. This is particularly important in the present invention because of the way in which the collar 13 is disengaged positively by the sliding engagement of cams 21 on the periphery of the collar 13 with radially disposed pins 22 supported in diametrically opposed relation in bearings 23 on the column 9 for movement toward and away from the collar. The fact that the disengagement is brought about by symmetrically arranged cam and pin means 21—22, makes for smooth operation and minimum danger of binding of the collar. A plurality of compression springs 24 are disposed in holes 25 provided in the collar 13 parallel to the bore 19 and in equally circumferentially spaced relation relative to the bore, and bear at one end on the annular shoulder 26 on the shaft 11 and at the other end on the ring 27 fastened to the side of the collar 13 as by screws 28, whereby normally to urge the collar 13 toward the gear 12 to engage the teeth or jaws 14 and 15. The clutch teeth 14 are provided on the ring 27, and hence may be easily renewed by replacement of the ring 27 when these teeth become too worn. In like manner, the clutch teeth 15 are provided on a replaceable ring 29 suitably secured to the side of the gear 12. The fact that the springs 24 are symmetrically arranged in the collar 13 makes for quick and easy operation without danger of binding. The collar 13 is engaged with the gear 12 under the action of the springs 24 practically instantaneously when the collar is released by withdrawal of the pins 22. The teeth 15, as indicated in Figs. 5 to 7, are of the conventional form with the inclined or beveled sides 30 adjacent spring-pressed plungers 31 which normally project to the extent indicated in Fig. 5, but are arranged to be depressed, as indicated in Fig. 6, by the teeth 14 in the preliminary stage of clutch engagement but thereafter spring out again, as in Fig. 7, to fill in the gaps between the teeth 14 and 15 to close the engagement of the clutch and eliminate backlash.

The pins 22, when moved outwardly, release the collar 13 to engage the clutch, and, when moved inwardly for engagement with the cams 21, serve to positively return the collar 13 against the action of the springs 24 to disengage the clutch. The pins 22 are interconnected, as will now be described, for simultaneous movement inwardly and outwardly in timed relation to the turning of the shaft 11, whereby to permit only one revolution of the shaft. Thus, the plates 32 on which the bearings 23, previously referred to, are provided have levers 33 pivoted thereon, as at 34, and pivotally connected at one end to the pins 22, as at 35, and pivotally connected at the other ends, as at 36, to push and pull rods 37. The latter extend toward one another from above and below the collar 13 and are pivotally connected to a cross-head 38, as at 39, on opposite sides of the pivotal support 40 provided for said cross-head on a bracket 41 suitably secured to the side of the adjacent column 9. A roller 42 is suitably supported on the side of the cross-head 38 and projects toward the periphery of the collar 13 for engagement by a cam 43 on the periphery of the collar. A pin 44 in the forked end 45 of the cross-head 38 is arranged to be received in a notch 46 in the side of a link 47 which is hereinafter referred to as the treadle link, inasmuch as it is arranged to be operated by the conventional foot treadle, not shown, which operates the pull rod 48 pivotally connected, as at 49, to the treadle link 47. A coiled tension spring 50 attached to the column 9, as shown in Fig. 3, and to the free end of the treadle link 47, tends to keep the link connected with the cross-head. A cam projection 51 on the free end of the treadle link moves into the path of a radial projection 52 on the periphery of the collar 13 when the treadle link 47 is pulled down to move the cross-head 38 to the position shown in Figs. 6 and 8 for engagement of the clutch. Thus, if the operator after depressing the foot treadle keeps his foot on it, so that the treadle link 47 would not be free to move upwardly with the cross-head 38 when the latter resumes the position shown in Fig. 3 at the end of one revolution of the shaft 11, the projection 52 will encounter the cam 51, as illustrated in Fig. 8, and automatically disconnect the treadle link from the cross-head. In that way, the clutch is disengaged at the end of one revolution regardless of the operator's holding the foot treadle down. In passing, it will be observed in Fig. 3 that a stop 52' projecting from the side of the column 9 limits the counterclockwise turning of the cross-head 38 about the pivot 40 as a center so that the pins 22 cannot move inwardly toward the periphery of the collar any farther than shown in Fig. 4. The screw and nut adjustments for the rods 37, indicated at 53 in Fig. 3, also determine the extent to which the pins 22 can move inwardly for engagement with the cams 21.

The operation of the clutch can best be understood by reference to Figs. 5 to 7 in connection with Figs. 3 and 4. The parts are shown in Figs. 3, 4, and 5 as they appear with the clutch disengaged. The gear 12 is then turning freely relative to the shaft 11 and collar 13 in a counterclockwise direction, as viewed in Fig. 2 and as indicated by the arrow in Fig. 5. Now, if the operator depresses the foot treadle, the treadle link 47 is pulled down and swings the cross-head 38 in a clockwise direction, as viewed in Fig. 3, to the position indicated in dotted lines in Fig. 6, thereby withdrawing the pins 22 from engagement with the cams 21 so as to release the collar 13 for engagement of the clutch teeth 14—15 under action of the springs 24. In this preliminary engagement, which is illustrated in Fig. 6, the collar 13 has moved alongside the gear 12, and the roller 42 on the cross-head 38 has moved to a position behind the cam 43. Now, of course, at that instant, the collar is still stationary and the gear 12 is turning in the direction indicated by the arrow in Fig. 6. The collar starts turning with the gear when the clutch teeth 15 strike the clutch teeth 14, as indicated in Fig. 7, and at that same instant the spring-pressed plungers 31, as previously explained, move outwardly to close the gaps left between the teeth 14 and 15 to secure full engagement of the clutch and eliminate backlash. The collar 13 is now turning with the gear 12 and should be permitted to make only one complete revolution, this being a single revolution clutch. Hence, as illustrated in Fig. 7, just before the completion of one revolution, the beveled end 54 of the cam 43 encounters the roller 42 and swings the cross-head 38 about its pivot 40 from the position shown in Fig. 6 to that shown in Fig. 7; that is to say, back to the position shown in Figs. 3 and 5. The pins 22 are accordingly moved inwardly by reason of their connections with the cross-head 38, and at the instant depicted in Fig. 7 are disposed just in front of the beveled portions 55 of the cams 21. A dwell 56 on the cam 43 is provided to permit the collar 13 to turn relative to the roller 42 through the small angularity required to bring the beveled portions 55 of the cams 21 into engagement with the pins 22. When that occurs, the collar 13, as it continues to turn, is moved positively away from the gear 12 to the position illustrated in Fig. 5. The angled portion 57 on the cam 43 also cooperates with the roller 42 at the same time that the pins 22 are slidably engaging the cams 21, whereby to assist in disengagement of the clutch. In fact, the angularity at 57 is slightly greater than at 55, so that the disengagement is commenced by the pins 22 and completed by the roller 42, thus distributing the load and minimizing wear of the parts. When the clutch is fully disengaged, as illustrated in Fig. 5, the roller 42 is in engagement with the dwell 58 provided on the cam 43. If the operator has, through carelessness or otherwise, failed to take his foot off the treadle, and is therefore holding the treadle link 47 down, then the projection 52 which comes into engagement with the cam 51 at substantially the same instant that the cam 43 encounters the roller 42, at the commencement of the disengagement of the clutch, will force the link away from the cross-head 38 to disengage the pin 44 from the notch 46 in the link and allow the cross-head 38 to swing about its pivot 40 independently of the link to the position depicted in Fig. 7. In other words, the clutch operating mechanism is automatically disconnected from the manually operated part 47, and the disengagement of the clutch proceeds automatically. Of course, if the operator after depressing the treadle in the usual way to start the cycle has taken his foot off the treadle, the link 47 will move with the cross-head 38 and the connection at 44—46 will not be disconnected because under those circumstances the cam 51 moves out of the path of the projection 52 to the position shown in Fig. 2. Inasmuch as it is common practice to have the pull rod 48 returned by a spring (not shown), the treadle link 47 will resume its connection automatically with the cross-head 38 after an automatic disconnection, just as soon as the operator takes his foot off the treadle and allows the rod 48 and link 47 to move upwardly under the action of the return spring.

It is believed the foregoing description conveys a good understanding of the objects and advantages of my invention. The appended claims have been drawn with a view to covering all legitimate modifications and adaptations.

I claim:

1. In a single revolution clutch, driving and driven members arranged to be moved toward and away from one another for connection and disconnection, spring means normally tending to cause movement of one of said members relative to the other in one direction, cam and follower means arranged to be releasably engaged to move the movable member in the opposite direction, manually operable means for operating the releasable element of said cam and follower means in one direction to cause connection of said members and commence a revolution of the driven member, another cam means turning with the driven member and arranged to operate the releasable element in the opposite direction to disconnect the driving and driven members at the end of one revolution, the aforesaid manually operable means including a manually operable member, and means providing a detachable operating connection between said manually operable member and the releasable element of said cam and follower means, and means turning with the driven member and arranged to automatically disconnect the manually operable member at the end of one revolution of the driven member in the event said manually operable member is held manually in a certain position.

2. In a single revolution clutch, a driving member, a driven member arranged to be moved toward and away from the driving member for connection therewith and disconnection therefrom, spring means normally urging the driven member toward the driving member for connection therewith, cam means turning with the driven member, follower means movable into engagement with the cam means to move the driven member away from the driving member, a control member movable in one direction manually to move the follower means away from the cam means, whereby to permit movement of the driven member toward the driving member to commence a revolution of the driven member, cam means turning with the driven member and arranged to move the control member in the opposite direction at the end of one revolution of the driven member, whereby to move the aforesaid follower means into engagement with its cam means, a manually operable element, having a detachable connection with the control member, and means turning with the driven member and arranged to disconnect the manually operable element at the end of one revolution of the driven member in the event the manually operable element is not movable with the control member in its return movement.

3. In a single revolution clutch, a driving member, a driven member arranged to be moved toward and away from the driving member for connection therewith and disconnection therefrom, spring means normally urging the driven member toward the driving member for connection therewith, cam means turning with the driven member, follower means movable into engagement with the cam means to move the driven member away from the driving member, a control member movable in one direction manually to move the follower means away from the cam means, whereby to permit movement of the driven member toward the driving member to commence a revolution of the driven member, cam means turning with the driven member and arranged to move the control member in the opposite direction at the end of one revolution of the driven member, whereby to move the aforesaid follower means into engagement with its cam means, a manually operable control element, a connecting link providing a detachable connection between the control element and the control member, spring means normally urging the connecting link in one direction to maintain the connection, and means turning with the driven member and arranged to move the connecting link in the opposite direction in the event the manually operable element and connecting link are not movable with the control member in its return movement.

4. In a single revolution clutch, driving and driven members arranged to be engaged and disengaged, spring means normally tending to cause engagement of said members, cam means arranged when rendered operative to cause disengagement of said members, a manually operable control element for rendering the cam means inoperative whereby to commence a revolution of the driven member, intermediate control means between the manual control element and the cam means movable in one direction by said element, means turning with the driven member to move said intermediate control means in the opposite direction at the end of one revolution of the driven member, whereby to render the cam means operative and normally also return the manual control element to its initial position, means providing a detachable connection between the manual control element and the intermediate control means, and means turning with the driven member and arranged to operate the last-mentioned means to disconnect the manual control element in the event the latter is held against return movement.

5. In a single revolution clutch, driving and driven members arranged to be engaged and disengaged, spring means normally tending to cause engagement of said members, cam means arranged when rendered operative to cause disengagement of said members, a manually operable control element for rendering the cam means inoperative whereby to commence a revolution of the driven member, intermediate control means between the manual control element and the cam means movable in one direction by said element, means turning with the driven member to move said intermediate control means in the opposite direction at the end of one revolution of the driven member, whereby to render the cam means operative and normally also return the manual control element to its initial position, a connecting link providing a detachable connection between the manual control element and the intermediate control means, spring means normally urging the connecting link in one direction to maintain the connection, and means turning with the driven member and arranged to move the connecting link in the opposite direction in the event the manual control element and connecting link are held against movement with the intermediate control means.

6. In a single revolution clutch, a driven shaft, a driving element rotatable freely relative thereto, a driven clutch collar non-rotatable on the driven shaft but slidable into and out of clutch engagement with the driving element, spring means normally urging the collar toward engaged position, a cam on the periphery of the collar turning therewith, a follower pin reciprocable substantially radially relative to the collar into and out of engagement with the cam, whereby upon engagement with the cam while the collar is turning to cause disengaging movement of the collar, a control member operatively connected with said follower pin, a manually operable element arranged when moved in one direction to move the control member so as to disengage the follower pin from the cam to commence a revolution of the collar, a disengaging cam turning with the collar arranged to return the control member to initial position at the end of one revolution of the collar, said manually operable element having a detachable operating connection with the control member, and means also turning with the collar arranged to disconnect the manually operable element from the control member in the event said element is not free to move with the control member in its return movement.

7. In a single revolution clutch, a driven shaft, a driving element rotatable freely relative thereto, a driven clutch collar non-rotatable on the driven shaft but slidable into and out of clutch engagement with the driving element, spring means normally urging the collar toward engaged position, a cam on the periphery of the collar turning therewith, a follower pin reciprocable substantially radially relative to the collar into and out of engagement with the cam, whereby upon engagement with the cam while the collar is turning to cause disengaging movement of the collar, a control member operatively connected with said follower pin, a manually operable element arranged when moved in one direction to move the control member so as to disengage the follower pin from the cam to commence a revolution of the collar, a disengaging cam turning with the collar arranged to return the control member to initial position at the end of one revolution of the collar, a connecting link providing a detachable connection between the manually operable element and the control member, spring means normally urging the connecting link in one direction to maintain the connection, and means turning with the collar and arranged to move the connecting link in the opposite direction in the event the manually operable element and connecting link are held against movement with the control member.

8. In a single revolution clutch, a driven shaft, a driving element rotatable freely relative thereto, a driven clutch collar non-rotatable on the driven shaft but slidable into and out of clutch engagement with the driving element, spring means normally urging the collar toward engaged position, diametrically opposed cams on the periphery of the collar turning therewith, diametrically opposed follower pins reciprocable substantially radially relative to the collar into and out of engagement with the cams, whereby upon engagement with the cams while the collar is turning to cause disengaging movement of the collar, an oscillatable cross-head operatively connected with said follower pins by means of push and pull rods connected to the cross-head on opposite sides of its center pivot, a manually operable element arranged when moved in one direction to move the cross-head so as to disengage the follower pins from the cams to commence a revolution of the collar, and a disengaging cam turning with the collar arranged to return the cross-head to initial position at the end of one revolution of the collar.

9. In a single revolution clutch, a driven shaft, a driving element rotatable freely relative thereto, a driven clutch collar non-rotatable on the driven shaft but slidable into and out of clutch engagement with the driving element, spring means normally urging the collar toward engaged position, diametrically opposed cams on the periphery of the collar turning therewith, diametrically opposed follower pins reciprocable substantially radially relative to the collar into and out of engagement with the cams, whereby upon engagement with the cams while the collar is turning to cause disengaging movement of the collar, an oscillatable cross-head operatively connected with said follower pins by means of push and pull rods connected to the cross-head on opposite sides of its center pivot, a manually operable element arranged when moved in one direction to move the cross-head so as to disengage the follower pins from the cams to commence a revolution of the collar, a disengaging cam turning with the collar arranged to return the cross-head to initial position at the end of one revolution of the collar, said manually operable element having a detachable operating connection with the cross-head, and means also turning with the collar arranged to disconnect the manually operable element from the cross-head in the event said element is not free to move with the cross-head in its return movement.

10. In a single revolution clutch, a driven shaft, a driving element rotatable freely relative thereto, a driven clutch collar non-rotatable on the driven shaft but slidable into and out of clutch engagement with the driving element, spring means normally urging the collar toward engaged position, diametrically opposed cams on the periphery of the collar turning therewith, diametrically opposed follower pins reciprocable substantially radially relative to the collar into and out of engagement with the cams, whereby upon engagement with the cams while the collar is turning to cause disengaging movement of the collar, an oscillatable cross-head operatively connected with said follower pins by means of push and pull rods connected to the cross-head on opposite sides of its center pivot, a manually operable element arranged when moved in one direction to move the cross-head so as to disengage the follower pins from the cams to commence a revolution of the collar, a disengaging cam turning with the collar arranged to return the cross-head to initial position at the end of one revolution of the collar, a connecting link providing a detachable connection between the manually operable element and the cross-head, spring means normally urging the connecting link in one direction to maintain the connection, and means turning with the collar and arranged to move the connecting link in the opposite direction in the event the manually operable element and connecting link are held against movement with the crosshead.

11. In a clutch, the combination of a driven shaft, a driving element rotatable freely relative thereto, said shaft having a portion of polygonal cross-section providing flat driving surfaces thereon arranged circumferentially thereof, a clutch collar having a central bore conformed to receive the polygonal portion of said shaft with a sliding fit, whereby said collar is movable toward and away from the driving element for clutching engagement therewith and is arranged to transmit drive to said shaft, a plurality of coiled compression springs disposed in longitudinal bores provided therefor in said collar in circumferentially spaced relation relative to the central bore, said springs serving normally to urge the collar toward clutching engagement with the driving element, a cam on the periphery of said collar, a follower pin movable inwardly toward the collar for engagement with said cam, whereby to positively effect disengaging movement of the collar against the action of the aforesaid springs, and a ring removably mounted on said collar and closing one end of all of said longitudinal bores whereby to provide an abutment on one face thereof for said springs, said ring having clutch teeth projecting therefrom.

12. In a clutch, the combination of a driven shaft, a driving element rotatable freely relative thereto, said shaft having a portion of polygonal cross-section providing flat driving surfaces thereon arranged circumferentially thereof, a clutch collar having a central bore conformed to receive the polygonal portion of said shaft with a sliding fit, whereby said collar is movable toward and away from the driving element for clutching engagement therewith and is arranged to transmit drive to said shaft, a plurality of coiled compression springs disposed in longitudinal bores provided therefor in said collar in circumferentially spaced relation relative to the central bore, said springs serving normally to urge the collar toward clutching engagement with the driving element, diametrically opposed cams on the periphery of said collar, follower pins disposed in diametrically opposed relation to said collar and movable simultaneously inwardly toward the collar for engagement with said cams, whereby to positively effect disengaging movement of the collar against the action of the aforesaid springs, and a ring removably mounted on said collar and closing one end of all of said longitudinal bores whereby to provide an abutment on one face thereof for said springs, said ring having clutch teeth projecting therefrom.

13. In a single revolution clutch, the combination of inter-engageable driving and driven elements, engaging and disengaging means, a cam turning with the driven element and arranged to cooperate with the disengaging means at the end of a single revolution to disengage the elements, a manually operable member for operating said disengaging means to retracted position at the commencement of a revolution, means providing a detachable connection between the manually operable member and said disengaging means and including a part movable with the disengaging means into and out of operative relation to the driven element, and a projecting part turning with the driven element and arranged to engage and move the last named part of said detachable connection in a predetermined timed relation with the engagement of the aforesaid cam with the disengaging means, whereby to forcibly disconnect the manually operable member from the disengaging means in the event said manually operable member is held against movement.

14. In a single revolution clutch, the combination of inter-engageable driving and driven elements, engaging and disengaging means, the disengaging means being operable automatically by the driven element at the end of a single revolution to separate said elements, a manually operable member normally tending to move in one direction but movable manually in the opposite direction to operate said disengaging means to retracted position at the commencement of a revolution, means providing a detachable connection between the manually operable member and the disengaging means, and means normally movable with the disengaging means into and out of operative relation with the driven element and automatically operable by the driven element substantially simultaneously with the disengaging operation of the disengaging means to forcibly disconnect said connection in the event the manually operable member is held against movement.

15. In a single revolution clutch, the combination of inter-engageable driving and driven elements, spring means normally tending to cause engagement therebetween, two disengaging means interconnected for operation in timed relation by linkage and arranged to separate the elements at the end of a single revolution, a manually operable member, means for providing a detachable operating connection between said member and said linkage whereby said disengaging means are operated to retracted position by the movement of the manually operable member to start a revolution, and means turning with the driven element and arranged to disconnect the manually operable member from the disengaging means at the end of a revolution in the event said manually operable member is held against movement with the disengaging means.

16. In a single revolution clutch, the combination of inter-engageable driving and driven elements, the elements normally tending to engage, means operated by the driven element for disengaging said elements, a manually operable control member normally tending to move in one direction but movable manually in the opposite direction to actuate the disengaging means so as to commence a revolution, and means normally movable with the disengaging means into and out of operative relation with the driven element and operable automatically at the end of a revolution of the driven element to disconnect the manually operable control member from the disengaging means in the event said member is held against movement.

17. In a single revolution clutch, driving and driven members arranged to be engaged and disengaged, spring means normally tending to cause engagement of said members, cam means arranged when rendered operative to cause disengagement of said members, a manually operable control element for rendering the cam means inoperative whereby to commence a revolution of the driven member, intermediate control means between the manual control element and the cam means movable in one direction by said element, means turning with the driven member to move said intermediate control means in the opposite direction at the end of one revolution of the driven member, said manual control element being detachably connected with said intermediate control means, and means turning with the driven member and arranged to disconnect said manual control element from said intermediate control means when the manual control element is held against return movement.

18. In a clutch of the character described, the combination of a driven shaft, a driving element rotatable freely relative thereto, a driven clutch collar non-rotatable on said shaft slidable normally into clutch engagement with the driving element, a cross-head pivotally mounted on a support stationary with respect to said shaft for oscillation in a plane substantially tangent to the periphery of the collar, said collar having cam means on the periphery thereof for engagement with a projection on said cross-head to operate the latter in timed relation to the revolution of said collar and effect disengagement of the collar at the end of a revolution thereof, cam follower means operable by said cross-head to hold the collar releasably in disengaged position, a manually operable member detachably connected with the cross-head to operate the latter and cause release of the clutch collar for the start of a revolution, a cam controlling the detachable connection and movable with the manually operable member into and out of operative relation to the collar, and a projection on said collar for engagement with said cam only when the manually operable member is held in clutch engaging position.

19. In a single revolution clutch, the combination of interengageable driving and driven elements, engaging and disengaging means, two means on the driven element associated with the disengaging means, one of which means operates the disengaging means automatically at the end of every single revolution of the driven element to disengage said driving and driven elements, a manually operable member movable from an "idle" position to a "running" position for operating said disengaging means to retracted position at the start of a revolution, and means movable with the disengaging means into and out of operative relation to the driven element and operable at the end of a revolution by the other of the aforesaid two associated means on the driven element substantially simultaneously with the disengaging operation of the disengaging means to forcibly disconnect the manually operable member from the disengaging means if the manually operable member is held in "running" position.

ROSS T. STEWART.